US007310617B1

(12) United States Patent
Cunningham

(10) Patent No.: US 7,310,617 B1
(45) Date of Patent: Dec. 18, 2007

(54) REAL-TIME FINANCIAL CARD OFFER AND APPLICATION SYSTEM

(75) Inventor: Gordon Cotter Cunningham, N. Palm Beach, FL (US)

(73) Assignee: Block Financial Corporation, Kansas City, MO (US)

( * ) Notice: Subject to any disclaimer, the term of this patent is extended or adjusted under 35 U.S.C. 154(b) by 0 days.

(21) Appl. No.: 09/323,715

(22) Filed: Jun. 1, 1999

Related U.S. Application Data

(63) Continuation of application No. 08/635,334, filed on Apr. 19, 1996, now Pat. No. 6,014,645.

(51) Int. Cl.
*G06Q 40/00* (2006.01)
(52) U.S. Cl. .......................................... 705/38; 705/35
(58) Field of Classification Search ................. 705/38, 705/39, 35, 40, 44; 235/380
See application file for complete search history.

(56) References Cited

U.S. PATENT DOCUMENTS

| 5,220,501 | A |   | 6/1993  | Lawlor ........................ 364/408 |
| 5,351,186 | A |   | 9/1994  | Bullock ....................... 364/401 |
| 5,528,490 | A |   | 6/1996  | Hill ............................. 364/403 |
| 5,611,052 | A |   | 3/1997  | Dykstra et al. ............... 395/238 |
| 5,659,731 | A |   | 8/1997  | Gustafson ................... 395/604 |
| 5,696,965 | A |   | 12/1997 | Dedrick ....................... 395/610 |
| 5,706,442 | A |   | 1/1998  | Anderson .................... 395/227 |
| 5,745,654 | A |   | 4/1998  | Titan ............................ 395/22 |
| 5,749,075 | A |   | 5/1998  | Toader ........................ 705/14 |
| 5,797,133 | A | * | 8/1998  | Jones et al. .................. 705/38 |
| 5,878,403 | A | * | 3/1999  | DeFrancesco et al. ........ 705/38 |
| 5,924,082 | A |   | 7/1999  | Silverman et al. |
| 5,940,811 | A | * | 8/1999  | Norris .......................... 705/38 |
| 5,953,710 | A | * | 9/1999  | Fleming ....................... 705/38 |
| 6,088,686 | A | * | 7/2000  | Walker et al. ................ 705/38 |
| 6,105,007 | A | * | 8/2000  | Norris .......................... 705/38 |

(Continued)

FOREIGN PATENT DOCUMENTS

JP         406309567 A    *  11/1994

(Continued)

OTHER PUBLICATIONS

Anonymous, "Credit Decision Cut Down to 10 Minutes", Bank Advertising News. North Palm Beach: Nov. 13, 1989.vol. 14, Iss. 10; p. 8.*

(Continued)

*Primary Examiner*—Narayanswamy Subramanian
(74) *Attorney, Agent, or Firm*—Standley Law Group LLP

(57) ABSTRACT

A system is disclosed for presenting financial card (e.g., credit card, debit card) offers to potential customers. Financial card applicant selection criteria and financial card term data are provided by participating financial institutions. An applicant interested in applying for a new financial card accesses the system via the Internet/World Wide Web. The applicant provides personal and financial data that are then analyzed in conjunction with data from outside sources (such as credit bureaus) to determine a financial risk rating for the applicant. The rating is used to locate financial card offers appropriate for the applicant. The applicant then peruses the offers and chooses one that meets his or her personal selection criteria. The applicant's data is then forwarded for processing to the participating financial institution that made the selected offer.

25 Claims, 4 Drawing Sheets

U.S. PATENT DOCUMENTS

| | | | |
|---|---|---|---|
| 6,289,319 B1* | 9/2001 | Lockwood | 705/35 |
| 6,817,521 B1* | 11/2004 | Matada | 235/380 |
| 2002/0178113 A1* | 11/2002 | Clifford et al. | 705/39 |
| 2002/0194094 A1* | 12/2002 | Lancaster et al. | 705/35 |
| 2007/0124238 A1* | 5/2007 | Hogg et al. | 705/38 |

FOREIGN PATENT DOCUMENTS

| JP | 409204468 A | * | 9/1997 |
|---|---|---|---|

OTHER PUBLICATIONS

Times—"Metairie Bank Joins Internet; [Third Edition]" Picayune (pre-1997 Fulltext). New Orleans, La.: Sep. 13, 1995 p. C.1.*

Morrall, Katherine., "Direct Marketing Goes On-Line", Bank Marketing. Washington: Sep. 1995.vol. 27, Iss. 9; p 21, 6 pgs.*

Anonymous, . "New sites on the World Wide Web Management Accounting." , Montvale: Dec. 1995.vol. 77, Iss. 6; p. 55, 1 pgs.*

Barefoot, Jo Ann S. When high-tech banking meets paper-based regs (Part 2) American Bankers Association. ABA Banking Journal. New York: Mar. 1996.vol. 88, Iss. 3; p. 30, 4 pgs.*

Dialog PR 05777108, "Credit Card Network Hits the Internet", p. 1018SE005, Oct. 1995.

American Banker, Network Assemble Card Issuers at an Internet Site, p. 11, Oct. 1995.

Internet Business News, Online Credit Card Sign-up Now Available, Nov. 1995.

Burek, John, The Hot Spot: the Credit Card Network (Web Site Provides Online Repository of Information Includes links to credit card, electronic cash and credit report services), v16, n3, p. 587, Mar. 1996.

Morall, Katherin, Profits by the Numbers, Bankers Monthly, v108 n11, pp. 25-29, Nov. 1991.

Brennan, Peter, Profitability Scoring Comes of Age, Bank Management, v69 n9, pp. 58-62, Sep. 1993.

Credit Card Management, First Union's Booming Online Branch, vol. 8 Issue 11, pp. 1-12, Feb. 1996.

Prince, Cheryl J., Caught in the WEB, Bank Systems Technology, Home Banking, Jul. 1995.

Koh, Hian Chye and Tan, Kim Wah, Construction of a Credit Scoring Model to Asses the Default Risk of Credit Card Applicants, International Journal of Management, vol. 11 No. 3, Sep. 1994.

"How to Find a Loan, Get Credit or Any Other Kind of Financing Now Up On World Wide Web Site", Computergram International, Aug. 17, 1995, ISSN: 0268-716X.

* cited by examiner

REAL-TIME FINANCIAL CARD OFFER AND APPLICATION SYSTEM

This application is a continuation of U.S. patent application Ser. No. 08/635,334 filed Apr. 19, 1996 now U.S. Pat. No. 6,014,645, which is incorporated herein by reference.

BACKGROUND OF THE INVENTION

1. Field of the Invention

The present invention relates generally to online financial systems for completing various financial transactions. Particularly, the present invention relates to an online, real-time system that allows a user to submit financial card application data and accept a financial card offer from a participating financial institution as based on predefined applicant selection criteria.

2. Description of Related Art

Financial institutions interested in locating new customers for their financial cards (such as credit cards, debit cards, etc.) often rely on direct mailings. These institutions may review personal information regarding income, education, assets (e.g., home ownership), and credit histories before deciding to solicit certain potential customers. In addition, the institutions determine the terms of the financial card offer (e.g., credit limit, interest rate, yearly fee, etc.) which are known in the industry as the "federal boxes." Using detailed selection criteria (e.g., female college graduates who own homes and have incomes over $25,000.00) and offer terms, an institution may send financial card applications to potential customers. These direct mailings are very expensive given the number of recipients who actually respond. The number is generally believed to be less than two percent (2%). Furthermore, because of the lead time and intensive labor required for printing, assembling, and mailing the financial card application packages, an institution must determine the selection criteria and the financial card terms long before the packages are sent. For a given direct mail campaign, once the process begins, there is little, if any, opportunity to change either the selection criteria or the terms. As a result, there is little opportunity to experiment or tune the process to find the most successful combinations of selection criteria and associated financial card terms. Even if the financial institution is willing to incur the costs associated with multiple direct mail campaigns, the target recipients may resent the repeated solicitations.

In addition to the disadvantages of the process for financial institutions, potential customers are also inconvenienced. Those direct mail recipients who are not interested in the offers must sort the "junk mail" from their regular personal and business mail. Those recipients who are interested in the offers must complete the applications manually, mail them back to the financial institutions, wait for them to be processed, and then wait for the financial card to arrive in the mail. Furthermore, some interested customers simply may be missed because, for a variety of reasons, they never make it on a mailing list. Customers who decide to shop on their own for a new financial card may be required to make inquiries at a number of financial institutions, each of which must analyze the applicant's data to determine which, if any, card is appropriate for the applicant. This process is time-consuming because multiple telephone calls are needed and the same information must be repeated for each institution. Furthermore, the potential customer may need to take notes regarding each offer or wait for offer information in the mail in order to compare the offers.

In general, the direct mail method makes it difficult for financial institutions and potential customers to connect. First, the application package may get lost in the mail or, if the intended recipient has moved, the application package may never reach the intended recipient. The inability to easily alter selection criteria and associated financial card term data may mean that would-be customers are excluded from the direct mail process. The lack of a single source of financial card application information makes it difficult for potential customers to learn of or review their options.

SUMMARY OF THE INVENTION

The present invention recognizes the limitations of using direct mailings for matching financial institutions and their card offerings with new customers. The present invention is a sophisticated computer system that allows users to peruse and accept financial card offers from financial institutions interested in locating new customers who meet specific selection criteria. The present invention—which may be accessed via the World Wide Web—prompts a user for pertinent information. Additional credit history data may be obtained using the personal and financial information provided by the user. A user may then be assigned a financial risk rating or grade/score based on the personal, financial, and credit history data provided to the system of the present invention. The financial risk rating may be used to locate financial card offers from financial institutions willing to extend offers to users with the specified rating. The user may then peruse the offers and accept an offer that meets his or her requirements. Following acceptance of an offer, the user's personal information is forwarded to the financial institution for processing and a financial card in accordance with accepted offer terms is sent to the user.

BRIEF DESCRIPTION OF THE DRAWING(S)

DETAILED DESCRIPTION OF THE PREFERRED EMBODIMENT(S)

Preferably, the present invention—Financial Card Application Service (Card Service)—is an electronic financial card application system implemented using the Internet's World Wide Web (WWW) technology. Distributed systems technology and a client/server model are used to create an architecture that allows Internet and Online Service users to access the Card Service using the Uniform Resource Locator/Identifier addressing scheme of the WWW. The Card Service is assigned a unique identifier (e.g., www.FinancialCard.com) that users provide to establish a connection to the WWW site where servers that provide the features and functionality of the present invention are located. Once connected to the site, users interact with HyperText Markup Language (HTML) documents to provide application data (personal and financial information) and to review and accept card offers from financial institutions. Communications between participating entities of the Card Service are accomplished, in part, using the HyperText Transfer Protocol (HTTP) of the WWW. Because the Card Service is based on Internet/WWW technology, it may be accessed through a number of interfaces—for example, native Microsoft® Windows™ applications or hyper-text mark-up language (HTML)/Web browsers.

Figure 1:
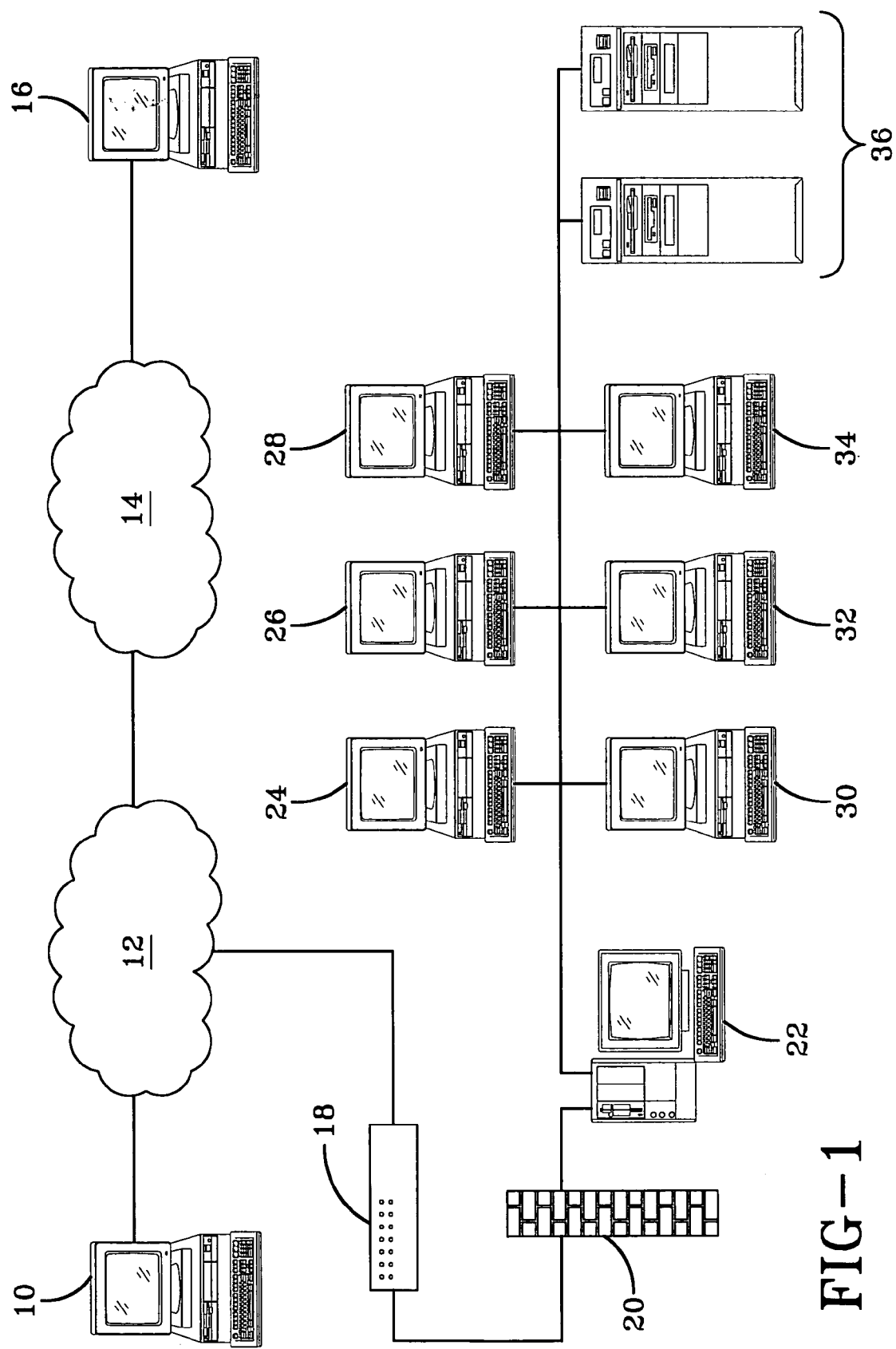
FIG. 1 is a diagrammatic representation of the primary components of the present invention.

Referring to FIG. 1, a diagrammatic representation of the primary components of the present invention is shown. Preferably, users connect to the Card Service via the Internet 12. The Card Service is implemented as a site on the WWW accessible via a unique identifier (e.g., www.FinancialCard.com.) Multiple user interfaces to the Card Service are implemented as different types of clients. Users may establish a direct connection to the Card Service via the Internet 12 by using a Web browser 10. Alternatively, they may establish a connection via an online service such as the CompuServe Information Service 14 and communicate with the Card Service using connection software such as the CompuServe Information Manager for Windows (WinCIM) 16. Methods for providing services via the Internet/WWW are well-known in the art and are not explained here.

In accordance with the standard communication mechanisms of the Internet/WWW, the TCP/IP protocol suite is used for communications between the primary components of the present invention. As shown in FIG. 1, packets in accordance with the TCP/IP protocol suite and destined for the Card Service are routed 18 to a Web Server 22 at the site for processing. Because security is a significant issue for online financial information systems, a Firewall 20 is established between the Router 18 and the Web Server 22. Transactions may then occur in a secure environment.

The Web Server 22, in turn, communicates with the Card Service servers 24-34 that provide the features and functionality of the present invention. Initially, the servers 24-34 may facilitate the retrieval and storage of information from participating financial institutions and credit bureaus. Preferably, the information is stored on database servers 36 with which the Card Service servers 24-34 interact to process transactions on behalf of users. When processing a transaction for a user interested in applying for a new financial card, the servers 24-34 may obtain information from the user and process it with the financial institution data stored on the database servers 36 and credit bureau information stored remotely (e.g., at the credit bureau) to determine which card offers are appropriate for the user. The servers 24-34 also may facilitate the user's review and acceptance of any offers. Finally, the servers 24-34 may communicate the acceptance of offers to the participating financial institutions so the users may receive their new financial cards.

The number of servers 24-34 in the system (including database servers 36) may be increased or decreased depending on the number of transactions processed during a given time period. Some servers may be dedicated to providing a particular type of service (e.g., obtaining information from participating financial institutions) while other servers may be set up to provide all types of services. In addition, all data may be stored in a single database on one or more database servers, or stored in multiple databases on one or more database servers. The configurations of the various servers may change to accommodate an increase or decrease in the number of transactions that are processed within a certain time frame.

Because the present invention is based on Internet/WWW technology, it may be made accessible twenty-four (24) hours a day from around the world. Potential customers may shop for a new card at their own convenience. Because potential customers are located through electronic means, financial institutions may reach them even if their mailing addresses or physical locations change frequently. In addition, the accessibility allows financial institutions to join the service at any time. Furthermore, financial institutions may upload to the databases selection criteria and financial card term data as needed.

Figure 2:
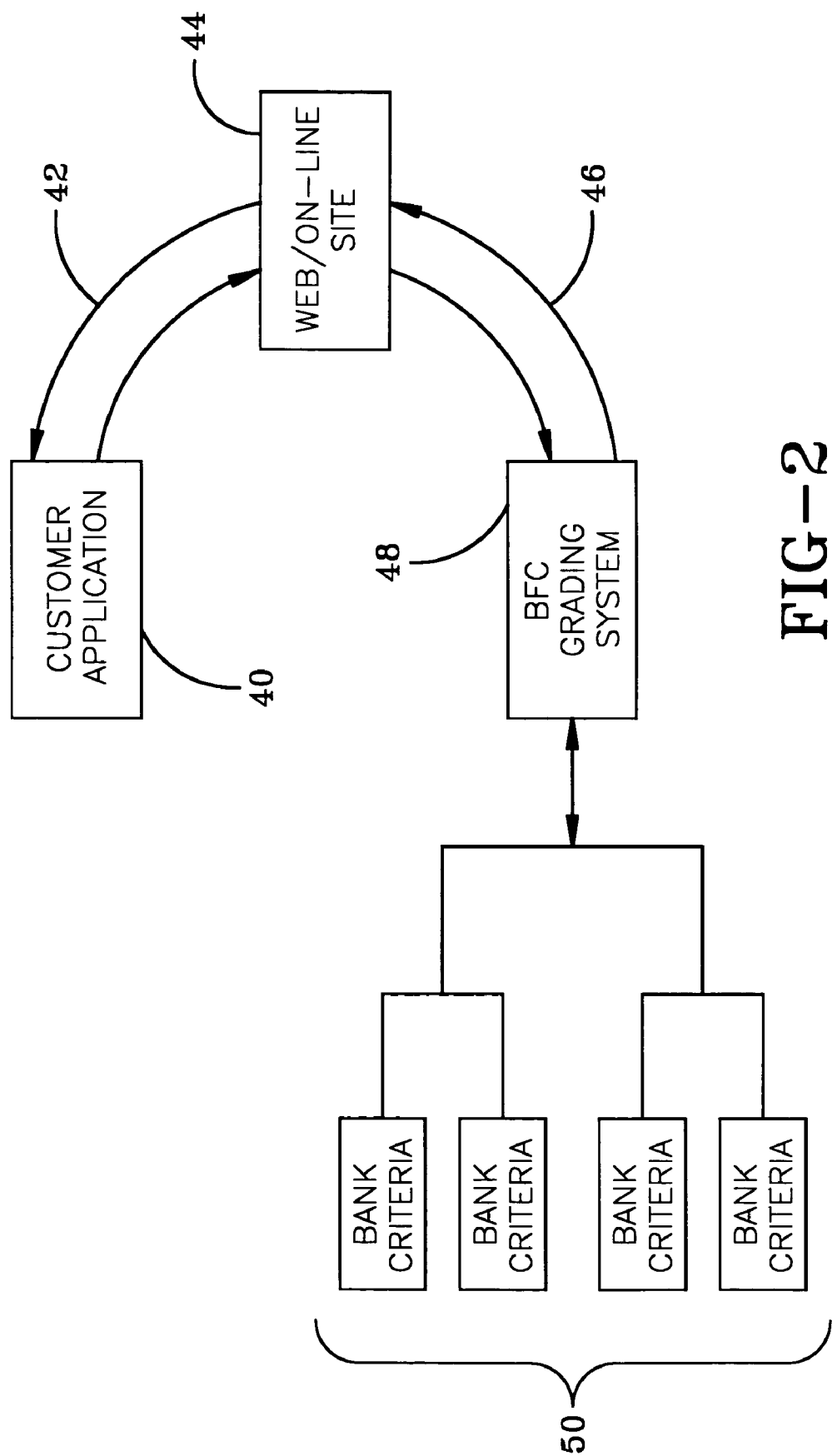
FIG. 2 is a dataflow diagram for a preferred embodiment of the present invention.

Referring to FIG. 2, a dataflow diagram for a preferred embodiment of the present invention is shown. Servers running application programs that provide the features and functionality of the present invention facilitate communication between potential financial card customers and participating financial institutions, interested in locating new customers. The process begins when a user (applicant) completes an application 40 by providing personal and financial information (application data) 42. The application data may include the applicant's name, telephone number, home address, e-mail address, income, other assets and liabilities, bank account numbers, etc. The servers at the Web/online site 44 prompt the applicant for the required information and then process it.

A "grading system" process 48 may be employed which uses the application data, as well as other data, as input to determine which financial card offers may be presented to the applicant. Preferably, the grading system assigns a grade/score to the applicant by using the application data and other information such as credit bureau data to derive a letter grade and a numerical score (e.g., A-760). The assigned grade/score may then be used to search each participating financial institution's selection criteria 50 to locate the offers that may be presented to the applicant. Preferably, a financial institution's selection criteria are organized in a matrix that associates financial card term data with a minimum grade/score combination. For example, a bank may have the following selection matrix.

| Grade | Score | Offer (Financial Card Term Data) |
|---|---|---|
| A | 700 and above | Offer 1 - no annual fee, 8.9% APR for 6 months, afterwards APR goes to 12% fixed, no cash advance fees or minimum finance charges |
| B | 780 and above | Offer 2 - no annual fee, 12.9% APR for 6 months, afterwards APR goes to 15% fixed, no cash advance fees or minimum charges |
| all others | | no offer |

If an applicant's assigned grade/score is A-701, Offer 1 is presented is this example. If the applicant's assigned grade/score is A-699, he or she will not receive an offer from this particular financial institution. The process is repeated for each participating financial institution. The applicant is then presented with offers appropriate for the assigned grade/score. The presentation of offers from participating financial institutions is, preferably, done in real-time on the applicant's computer display.

The grade/score assigned to the applicant by the grading system may be viewed as a financial risk rating. It takes into account various criteria and factors to determine whether a particular applicant should be extended an offer and if so, what the terms of the offer should be. For example, a financial institution may decide to offer a credit card with a low interest rate and a high credit limit to an applicant perceived to be a low risk (i.e., has a low financial risk rating.) Alternatively, a financial institution may decide to offer a credit card with a high interest rate and a low credit limit to an applicant perceived to be a high risk (i.e., has a high financial risk rating.)

The applicant may peruse, via the computer display, the "federal box" and other details of each of the offers to find the one that is most attractive (e.g., has the most favorable terms). If the applicant accepts one of the offers, the application data for the applicant is forwarded to the financial institution that made the accepted offer. The financial institution then processes the application and makes arrangements to send the financial card to the applicant.

Figure 3:
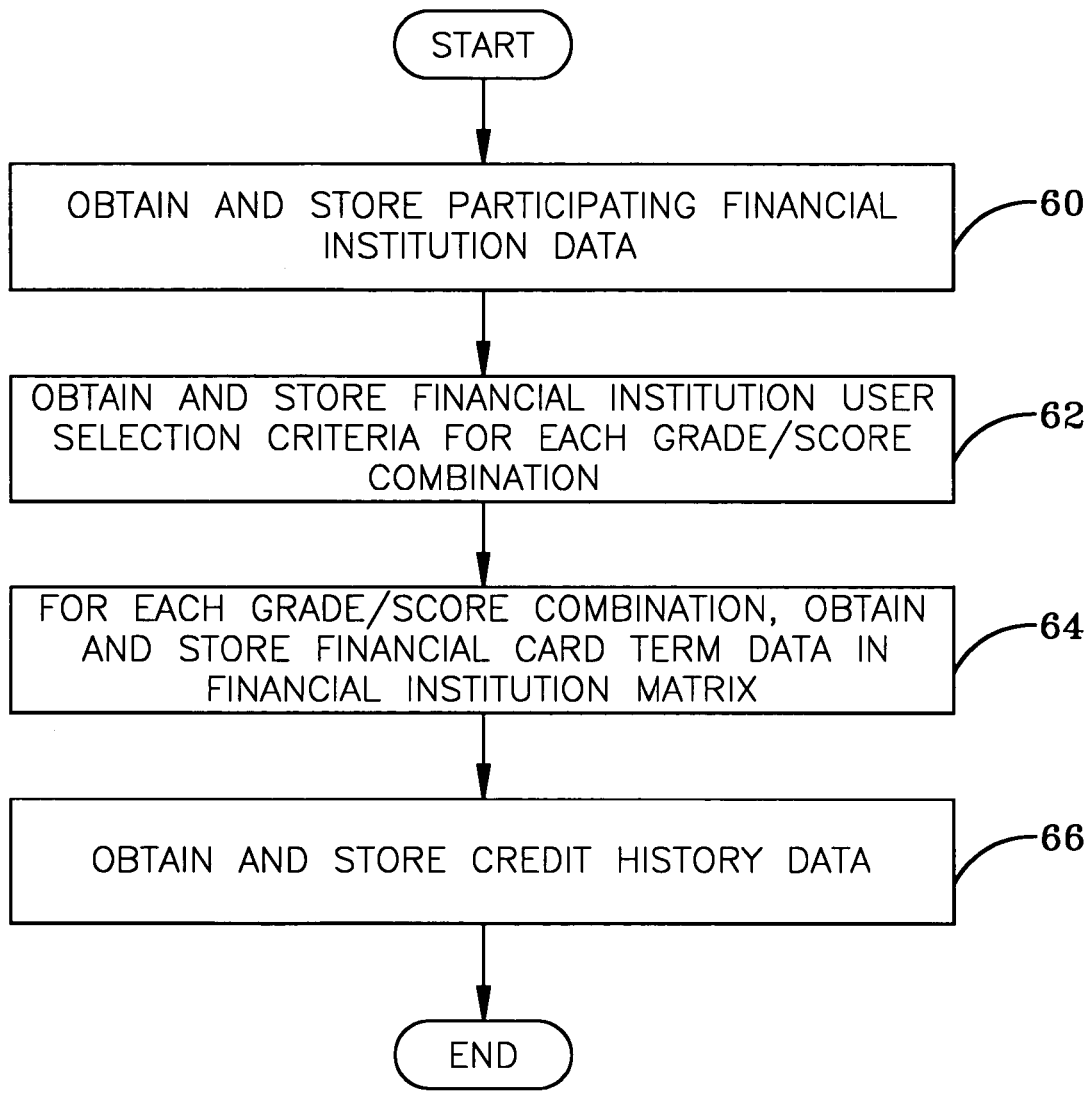
FIG. 3 is a flow chart of the primary steps for obtaining data from financial institutions and other outside sources.

Referring to FIG. 3, a flow chart of the primary steps for obtaining data from financial institutions and other outside sources is shown. Some information may be stored remotely and accessed as needed (e.g., credit bureau data) while other data (e.g., participating financial institution data, financial card term data) may be stored locally to improve performance of the system. In the first step 60, participating financial institutions provide contact and other information that may be needed to complete a transaction using the present invention (participating financial institution data.) For example, information for forwarding accepted offers may be stored for later retrieval. In the next step 62, selection criteria for each participating financial institution is obtained. In the next step 64, the terms of the financial card offers for the acceptable grade/score combinations are specified (financial card term data). Preferably, the selection criteria and financial card term data are organized in a matrix as described above. Different financial card terms may be specified for each grade/score combination for which the financial institution is willing to make an offer. Finally, in step 66, information from credit bureaus and other third party sources may be retrieved and stored. Preferably, the stored information is access or contact information that may be used to obtain up-to-date credit bureau data directly while a transaction is being processed. Using this approach, the most current credit bureau data may be used in determining a rating for an applicant.

In a preferred embodiment of the present invention, financial institutions are permitted to update their selection criteria and financial card term data frequently. The modified data may be uploaded as needed to the databases that support the transaction processing. A financial institution may be able to increase the likelihood its offers are accepted by changing the selection criteria (i.e., financial risk rating) and associated term data. For example, an institution may decide to lower the score associated with a particular grade so that more applicants may be presented with a particular offer. An institution may also decide to add offers for other grade/score combinations.

The ability to alter online financial risk ratings and associated financial card term data in a substantially continuous, real time manner—a unique aspect of the present invention—results in substantial benefits to both financial institutions and financial card customers that direct mail and other forms of offers do not provide due to their static nature. Financial institutions may adapt the selection criteria as needed in accordance with the perceived needs of potential customers. In addition, the flexibility of the present invention (i.e., the ability to electronically compose and present offers) allows financial institutions to change the terms of offers or to increase the number of offers with different terms. Consequently, potential customers are more likely to find a financial card appropriate for their circumstances (e.g., because the grade/score associated with particular term data has changed, or because the term data associated with a particular grade/score has changed, or because new grade/score and term data pairs have been defined.) Using the present invention, customers, who one day are unable to locate a financial card that meets their needs, may, the next day, find one that meets their needs. Consequently, both the customer who accepts the financial card offer and the financial institution that sponsors the offer benefit.

Figure 4:
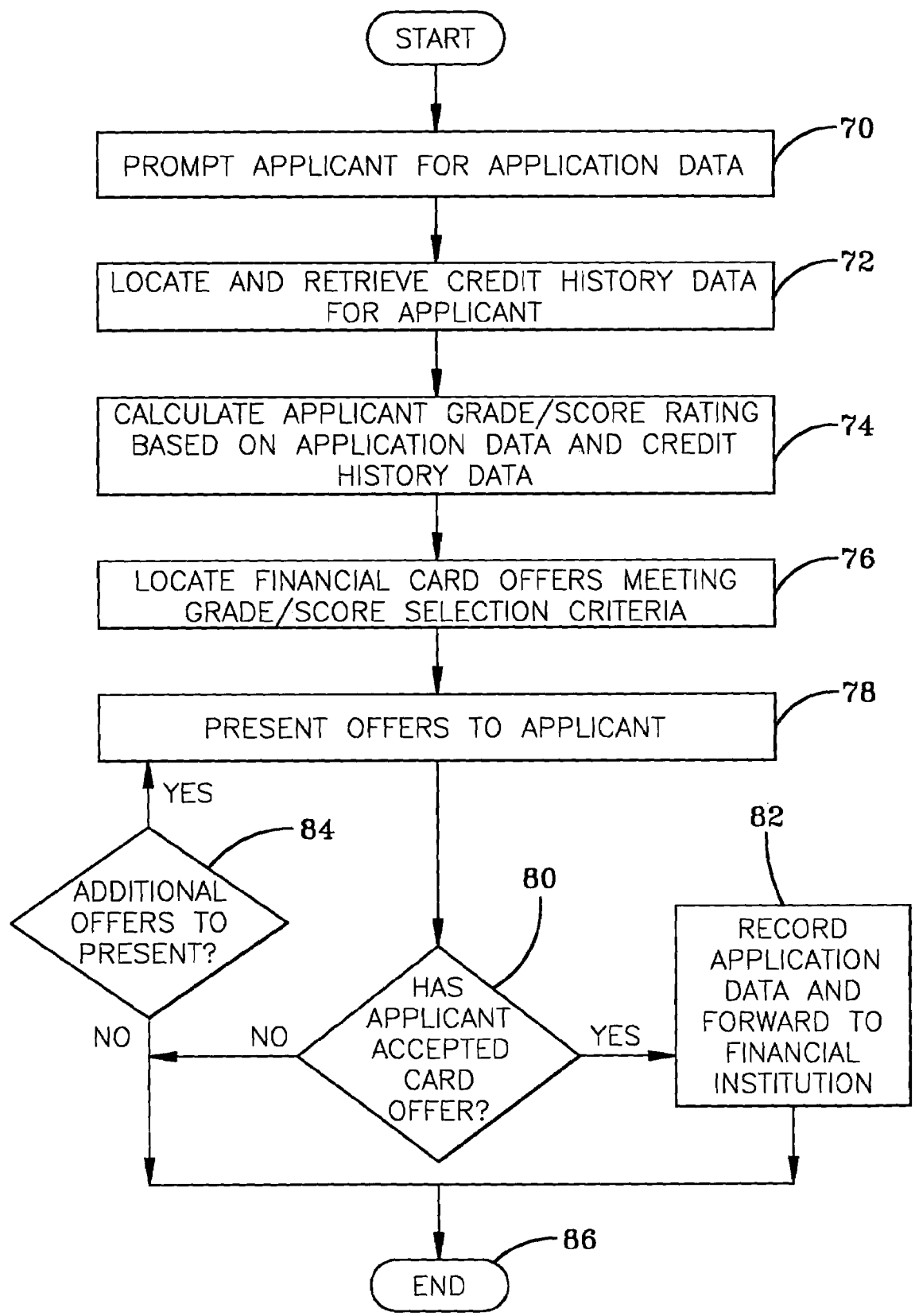
FIG. 4 is a flow chart of the primary steps for processing an applicant transaction.

Referring to FIG. 4, a flow chart of the primary steps for processing a user (applicant) transaction is shown. In the first step 70, the applicant is prompted for application data. Using the application data, the applicant's credit history data are located and retrieved for processing 72. Next 74, a grade/score is calculated and assigned to the applicant. The grade/score is calculated using the application data and credit history data obtained directly from the credit bureau in real-time. The selection criteria as embodied in each financial institution's selection matrix is reviewed to locate the financial card offers appropriate for the applicant 76. Each offer is then presented to the applicant for his or her review 78. Offers may be presented in a variety of formats. For example, a summary of each offer may be presented in the form of a menu from which the applicant may make a selection to review details of the offer. Alternatively, each offer may be presented in a series of single computer screen displays. If the applicant accepts an offer 80, the application data is recorded and forwarded to the financial institution sponsoring the offer 82. Otherwise, offers are presented to the applicant 78 until there are no additional offers to present 84 or the applicant quits 86.

The present invention offers substantial benefits to financial institutions and potential financial card customers. Using the present invention, financial institutions may easily alter selection criteria and associated financial card term data as well as increase the types of offers in order to locate new customers. Significant cost savings may be realized by use of the electronic means of the present invention, rather than direct mailings, to present financial card offers. Financial institutions and potential customers are more likely to connect with one another using the present invention because customers are not required to be in any particular physical location in order to receive an offer. Furthermore, they may review, at their own convenience, a variety of options from a variety of institutions via a single access point thus reducing the amount of time required to shop for a new card.

The present invention has been described with reference to preferred embodiments thereof. Various changes in form and details may be made without departing from the scope and spirit of the present invention.

What is claimed is:

1. An electronic method for locating financial card offers, comprising:
   (a) storing in at least one database financial card data for participating financial institutions, said financial card data comprising terms for at least one financial card offer from each of said participating financial institutions;
   (b) providing selection criteria associated with said financial card data from each of said participating financial institutions associated with said financial card data from each of said participating financial institutions;
   (c) prompting a computer user for application data for use in assigning a rating to said computer user to locate financial card offers for said computer user;
   (d) receiving at a server said application data from said computer user;
   (e) analyzing said application data provided by said computer user;

(f) assigning a rating to said computer user based on said analyzing of said application data;

(g) locating financial card offers for said computer user by comparing said rating of said computer user with said selection criteria of said financial card data for said participating financial institutions; and (h) presenting to said computer user for review said financial card offers located for said computer user by comparing said rating of said computer user with said selection criteria of said financial card data for said participating financial institutions.

2. The method of claim 1 further comprising sending said computer user a financial card in accordance with an accepted financial card offer.

3. The method of claim 1 wherein said rating is a financial risk rating.

4. The method of claim 1 wherein said participating financial institutions modify said financial card data.

5. The method of claim 1 further comprising the step of uploading said modified financial card data.

6. A method for presenting electronic financial card offers on a public network comprising:

creating a public network site on said public network, said site associated with an identifier for use by public network computer users to access said site;

defining terms for financial cards, said financial cards terms provided by a plurality of financial institutions;

associating selection criteria with each of said financial card terms provided by said plurality of financial institutions;

storing said financial card terms and said associated selection criteria in a database;

obtaining application data for a financial card applicant accessing said site using said identifier, said application data for use in providing a rating for said financial card applicant to locate offers for said applicant according to said selection criteria associated with said financial card terms provided by said plurality of financial institutions;

receiving said application data at a server connected to said public network site;

providing a rating for said financial card applicant, said rating provided in accordance with said application data for said financial card applicant;

locating offers to present to said financial card applicant, by comparing said financial card applicant rating with said selection criteria associated with each of said financial card terms provided by said plurality of financial institutions; and presenting to said financial card applicant for review offers located for said applicant by comparing said financial card applicant rating with said selection criteria associated with each of said financial card terms provided by said plurality of financial institutions.

7. The method of claim 6 further comprising sending information regarding said applicant to a participating financial institution sponsoring said offer accepted by said applicant.

8. The method of claim 6 further comprising sending to said applicant a financial card in accordance with an offer accepted by said applicant.

9. The method of claim 6 wherein said electronic financial card is selected from the group consisting of credit cards and debit cards.

10. A financial card offer system accessible via a public computer network comprising:

a public computer network site at a server connected to said public network for communicating with a financial card applicant using a computer;

at least one database in communication with said server for storing financial card data, said financial card data provided by a plurality of participating financial institutions and comprising selection criteria for at least one financial card offer;

at least one device in communication with said server adapted to access data from third party sources;

memory at said server for receiving and storing application data concerning said financial card applicant using said computer;

memory at said server for storing a rating for said financial card applicant, said rating determined in accordance with said application data concerning said financial card applicant and said data from said third party sources;

at least one financial card offer for said applicant, located from said database by said server by comparing said financial card applicant rating with said selection criteria for at least one financial card offer of said financial card data provided by said plurality of financial institutions; and a display at said computer for presenting to said applicant for review said financial card offer located for said applicant by comparing said financial card applicant rating with said selection criteria for at least one financial card offer of said financial card data provided by said plurality of financial institutions.

11. An electronic financial offering system comprising:

a first database for storing financial institution data comprising financial institution selection criteria and financial offering data for a plurality of participating financial institutions;

a second database for storing credit history data for a plurality of individuals; and one or more servers connected to a public network adapted to:

(a) obtain application data from an applicant using a computer connected to one of said servers using said public network;

(b) enter said application data in memory at one of said servers;

(c) obtain from said second database credit history data for said applicant in accordance with said application data;

(d) enter said credit history data in memory at said one of said servers;

(e) process said application data and said credit history data for said applicant to locate from said first database at least one financial offering for said applicant, said at least one financial offering meeting selection criteria for at least one of said plurality of participating financial institutions; and (f) present to said applicant for review at said applicant's computer at least one financial offering located for said applicant according to said application data, said credit history data, and said selection criteria for at least one of said plurality of participating financial institutions.

12. The system of claim 11 wherein said application data comprises the applicant's name, telephone number, home address, e-mail address, income, other assets and liabilities, and bank account numbers.

13. The system of claim 11 wherein said at least one financial offering for said applicant is located in accordance with a grading system process.

14. The system of claim 13 wherein said grading system process assigns a grade/score to the applicant using the application data and credit history data and uses the grade/score to search each participating financial institution's selection criteria to locate the appropriate financial offerings.

15. The system of claim 14 wherein each financial institution's selection criteria are organized in a matrix associating financial offering data with a minimum grade/score combination.

16. The system of claim 11 wherein each of said at least one financial offering is presented to the applicant in a single computer display.

17. The system of claim 11 wherein said at least one financial offering is presented in the form of a menu comprising a summary of said at least one financial offering from which the applicant may make a selection to review details of the financial offering.

18. The system of claim 11 wherein said at least one financial offering is a credit card offering.

19. A computerized method for presenting electronic financial offerings comprising:

obtaining financial institution data comprising financial institution selection criteria and financial offering data for participating financial institutions, wherein said financial institution selection criteria comprises financial risk ratings associated with financial offerings;

storing said financial institution data in a first database;

prompting an applicant using a computer for application data for use in assigning a financial risk rating to said applicant to locate financial offerings for said applicant;

receiving at a server from said applicant computer said application data;

obtaining from a second database credit history data for said applicant in accordance with said application data;

assigning a financial risk rating to said applicant in accordance with said credit history data from said second database;

selecting from said financial institution data for participating financial institutions financial offerings in accordance with said financial risk rating and said financial institution selection criteria for participating financial institutions; and presenting to said applicant at said computer for review selected financial offerings.

20. The method of claim 19 wherein prompting the applicant comprises prompting the applicant for the applicant's name, telephone number, home address, e-mail address, income, other assets and liabilities, and bank account numbers.

21. The method of claim 19 wherein assigning a financial risk rating comprises assigning a rating in accordance with a grading system process.

22. The method of claim 21 wherein said grading system process assigns a grade/score to the applicant using the application data and credit history data and uses the grade/score to search each participating financial institution's selection criteria to select financial offerings.

23. The method of claim 22 wherein each financial institution's selection criteria are organized in a matrix associating financial offering data with a minimum grade/score combination.

24. The method of claim 19 wherein presenting to said applicant selected financial offerings comprises presenting each of said selected financial offerings in a single computer display.

25. The method of claim 19 wherein presenting to said applicant selected financial offerings comprises presenting selected financial offerings in the form of a menu comprising a summary of each financial offering from which the applicant may make a selection to review details of the financial offering.

* * * * *